Figure 1:
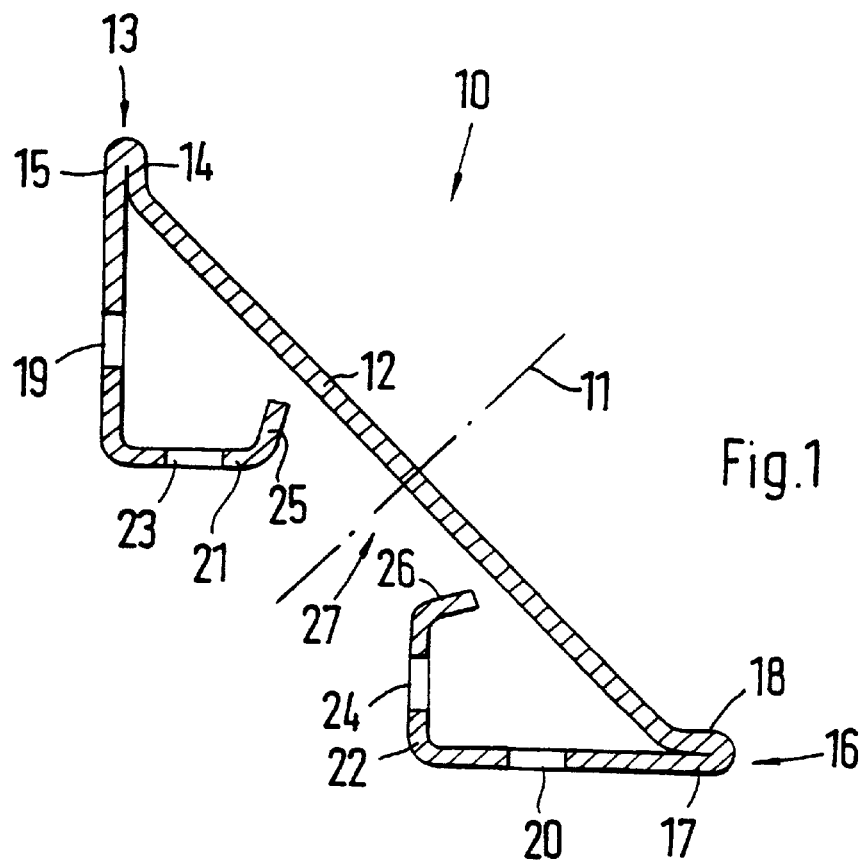

United States Patent
Benner et al.

[11] Patent Number: 5,930,972
[45] Date of Patent: Aug. 3, 1999

[54] FRAME PIECE FOR A SWITCHGEAR CABINET

[75] Inventors: Rolf Benner, Herborn-Amdorf; Wolfgang Reuter, Burbach, both of Germany

[73] Assignee: Rittal-Werk Rudolf Loh GmbH & Co. KG, Herborn, Germany

[21] Appl. No.: 08/973,266

[22] PCT Filed: Sep. 30, 1996

[86] PCT No.: PCT/EP96/04277

§ 371 Date: Nov. 26, 1997

§ 102(e) Date: Nov. 26, 1997

[87] PCT Pub. No.: WO97/13305

PCT Pub. Date: Apr. 10, 1997

[51] Int. Cl.$^6$ .................................................. B25G 3/26
[52] U.S. Cl. .................. 52/653.1; 52/633; 52/590.1; 52/730.5; 52/731.5; 211/189; 211/26; 403/14; 403/384
[58] Field of Search .................................. 52/633, 653.1, 52/730.5, 731.3, 590.1; 211/189, 191, 26; 403/13, 14, 386, 384

[56] References Cited

U.S. PATENT DOCUMENTS

| | | | |
|---|---|---|---|
| 2,356,309 | 8/1944 | Garbe | 52/731.3 |
| 3,037,590 | 6/1962 | Pavlecka | 52/731.3 |
| 3,127,995 | 4/1964 | Mosinski | 211/191 |
| 3,143,214 | 8/1964 | Moore et al. | 211/26 |
| 3,526,074 | 9/1970 | Miller | 52/730.5 |
| 3,733,755 | 5/1973 | Butler | 211/191 |
| 4,158,998 | 6/1979 | Clement | 211/191 |
| 4,287,994 | 9/1981 | Klein | 211/191 |
| 4,564,111 | 1/1986 | Suttles | 211/189 |
| 4,643,319 | 2/1987 | Debus | 211/189 |
| 4,782,637 | 11/1988 | Eriksson | 52/653.1 |
| 4,869,380 | 9/1989 | Metcalfe | 211/189 |
| 4,988,008 | 1/1991 | Blum | 211/26 |
| 5,052,565 | 10/1991 | Zachrei | 211/26 |
| 5,749,476 | 5/1998 | Besserer | 211/26 |

FOREIGN PATENT DOCUMENTS

| | | |
|---|---|---|
| 2681402 | 3/1993 | France ............................ 52/653.1 |
| 8107658 | 8/1981 | Germany . |
| 8138352 | 10/1982 | Germany . |
| 8703695 | 2/1988 | Germany . |
| 8130103 | 3/1991 | Germany . |
| 4227532 | 2/1994 | Germany . |
| 4336187 | 4/1995 | Germany . |
| 4336204 | 4/1995 | Germany . |

Primary Examiner—Carl D. Friedman
Assistant Examiner—Phi Dieu Tran A
Attorney, Agent, or Firm—Pauley Petersen Kinne & Fejer

[57] ABSTRACT

A frame structure assembled from frame limbs for a switch gear cabinet, in which the frame limbs are preferably designed in mirror-image like manner in relation to their cross-sectional diagonals and in the interior region of the frame structure comprise two receiving formations, having fastening rebates for fastening mounting rails. The receiving formations are orientated parallel to associated exterior sides of the frame structure. The interconnection of frame limbs and mounting rails is simplified and improved because the receiving formations pass into terminal sections, bent over once or twice, forming an open dovetail groove or a closed dovetail groove for fixing the mounting rails that have appropriate engagement formations.

13 Claims, 4 Drawing Sheets

FRAME PIECE FOR A SWITCHGEAR CABINET

The invention relates to a frame structure assembled from frame limbs for a switch gear cabinet in which the frame limbs are preferably designed in mirror-image like manner in relation to their cross section diagonals and in the interior region of the frame structure comprise two receiving formations provided with fastening rebates for fastening mounting rails, the said receiving formations being orientated parallel to the associated exterior sides of the frame structure.

A frame structure of this type is known from DE 43 36 204. Having only few fastening rebates and/or bores, the frame limbs merely form a support structure which at any desired location at the frame limbs may be provided with mounting rails, in which context the mounting rails provide fixation facilities in accordance with a predetermined modular system in two directions normal to one another.

The rebates for the mounting rails are confined by two receiving formations of the frame limbs, at right angles to one another, for which purpose preferably mounting rails are used which are substantially designed as square hollow profile sections, the said mounting rails being fitted to the receiving formations of the frame limbs by way of screw connections or specifically designed connecting components.

It is the object of the invention to provide a frame structure of the type set out in the opening paragraph, in which in a simple manner differently designed mounting rails may be positioned rapidly and firmly in the rebates of the frame limbs.

This object is attained according to the invention in that the receiving formations pass into terminal sections bent over once or twice, forming an open dovetail groove or a closed dovetail groove for fixing the mounting rails provided with appropriate engagement formations.

The dovetail groove and the engagement formations of the mounting rails provide a simple snap on connection between the frame limb and the mounting rail. The mounting rail is just simply clipped into the rebate of the frame limb and thus tightly held on the frame limb.

Positioning of the mounting rails fixed to the frame limb is attained in a simple manner in that the mounting rails are provided with a retention pin which is inserted or adapted to be inserted into a fixation rebate of the receiving formations of the frame limb.

In this manner the fixation rebates and/or bores of the mounting rails may be oriented towards the fixation bores and/or bores of the frame limbs. This is attained solely by the correct disposition of the retention pin on the mounting rail.

According to an embodiment it is provided that the mounting rails comprise fastening limbs which bear against the receiving formations of the frame limbs, that these fastening limbs pass into the engagement formations and that the terminal sections form an obtuse angle with the first partial section in relation to the receiving formations just as the engagement formations at the fastening limbs of the mounting rails. This results in a close fit having a large abutment surface between the mounting rail and the frame limb.

According to certain embodiments, the mounting rails may be so designed that the mounting rails take the form of open hollow profile sections having a cross-section, which is substantially square, that the fastening limbs width-wise are made to match the width of the receiving formations of the frame limbs and that the profile sides of the mounting rails projecting beyond the rebate, outlined by the receiving formations, are provided with rows of fixation rebates and/or bores or that the mounting rails are designed as open hollow profile sections, that the fastening limbs width-wise are made to match the width of the receiving formations of the frame limbs, that the fastening limbs merge into profile sides outside the rebate, outlined by the receiving formations, at right angles to one another and that the said profile sides are interconnected via a connecting section following-on at an obtuse angle and provided with a row of fixation rebates. The mounting rail, apart from accommodating the frame limb, provides in any event sufficient fixation facilities in the modular system, which may likewise be applied to the frame limbs.

The fixation facilities may further be increased in that in the frame limbs, facing away from the terminal sections, vertical profile sides, provided with fixation rebates, follow on to the receiving formations, facing it the exterior ends of the frame structure, in which context in frame structures assembled in a row, fastening surfaces in common planes allow a simple through-going assembly between the frame structures.

An embodiment may also be so designed that the mounting rail has a U-shaped cross-section, for which purpose rows of fastening rebates and/or bores are incorporated in the limbs, that fastening lugs with a retention pin follow on to the far ends of the mounting rails, the retention pin being adapted to be inserted into a fixation rebate or a fixation bore and that at the far end of the mounting rail engagement formations are formed on, clipping into the dovetail groove and latching behind the terminal section facing the latter, if upright mounting rails are to be fitted to the frame limb, in turn using a snap on connection between the frame limb and the mounting rail.

Should the frame limb be so designed that the profile sides of the frame limbs are interconnected via a connecting section and that the second partial sections of the terminal sections, bent over twice, of the receiving formations bear against the connecting section and are firmly connected to the latter, an excellent stability is then conferred to it, in particular torsional rigidity.

The invention is elucidated in more detail by way of the working examples in the drawings.

Figure 2:
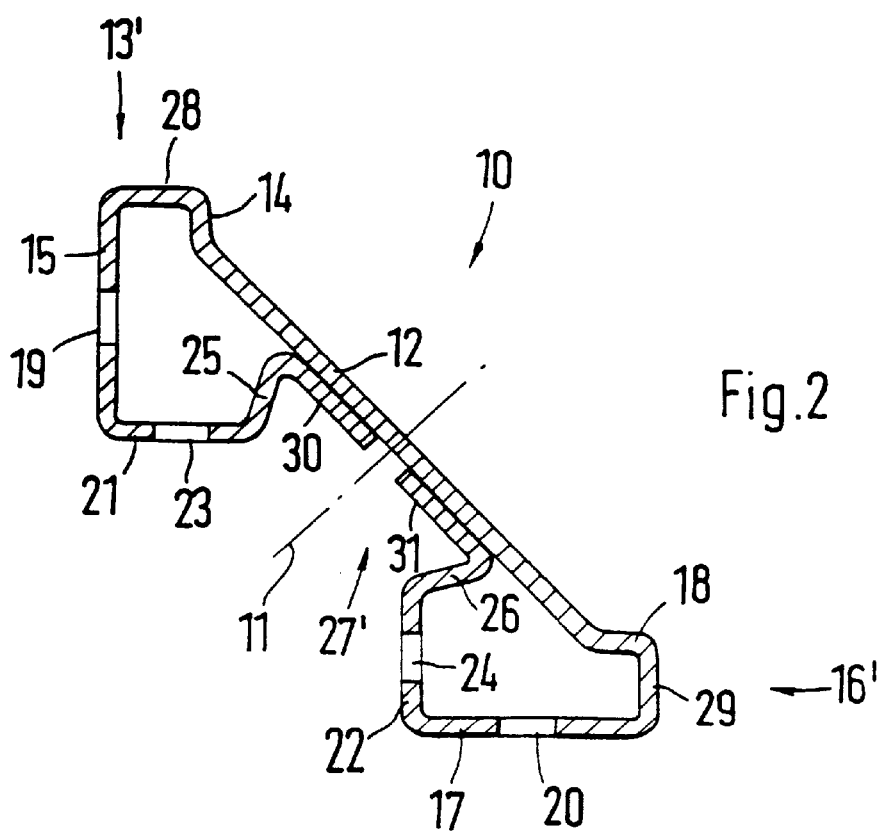
Figure 3:
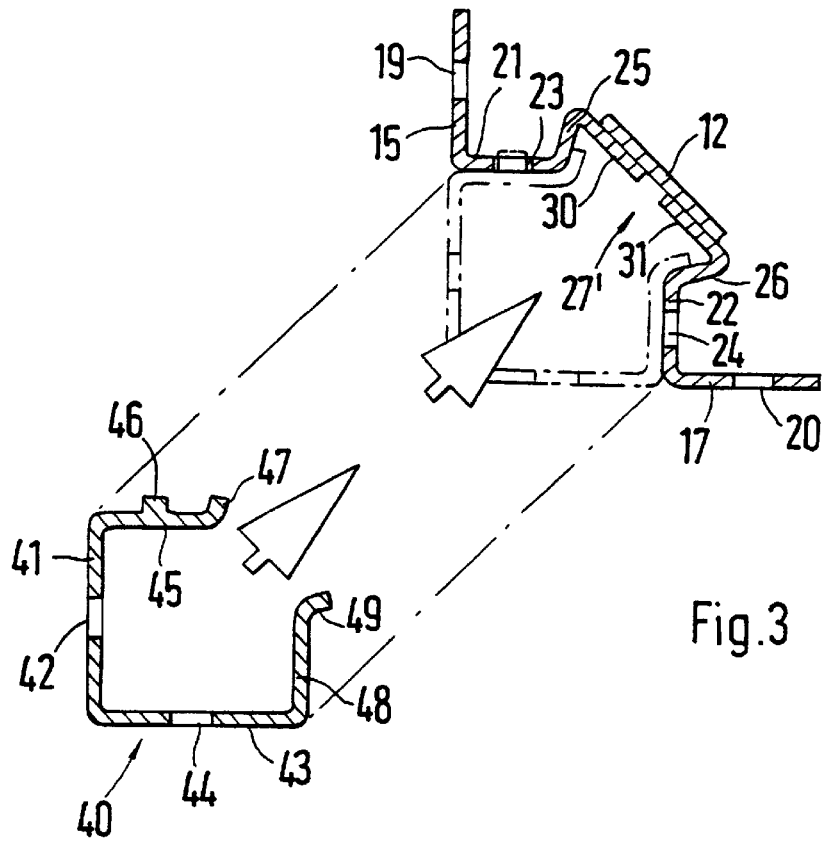
Figure 4:
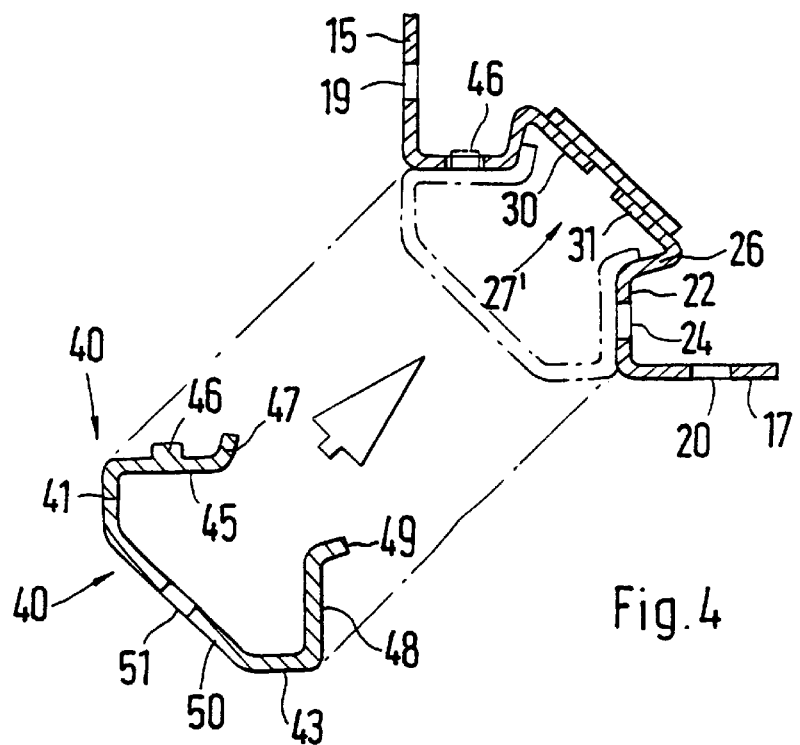
Figure 5:
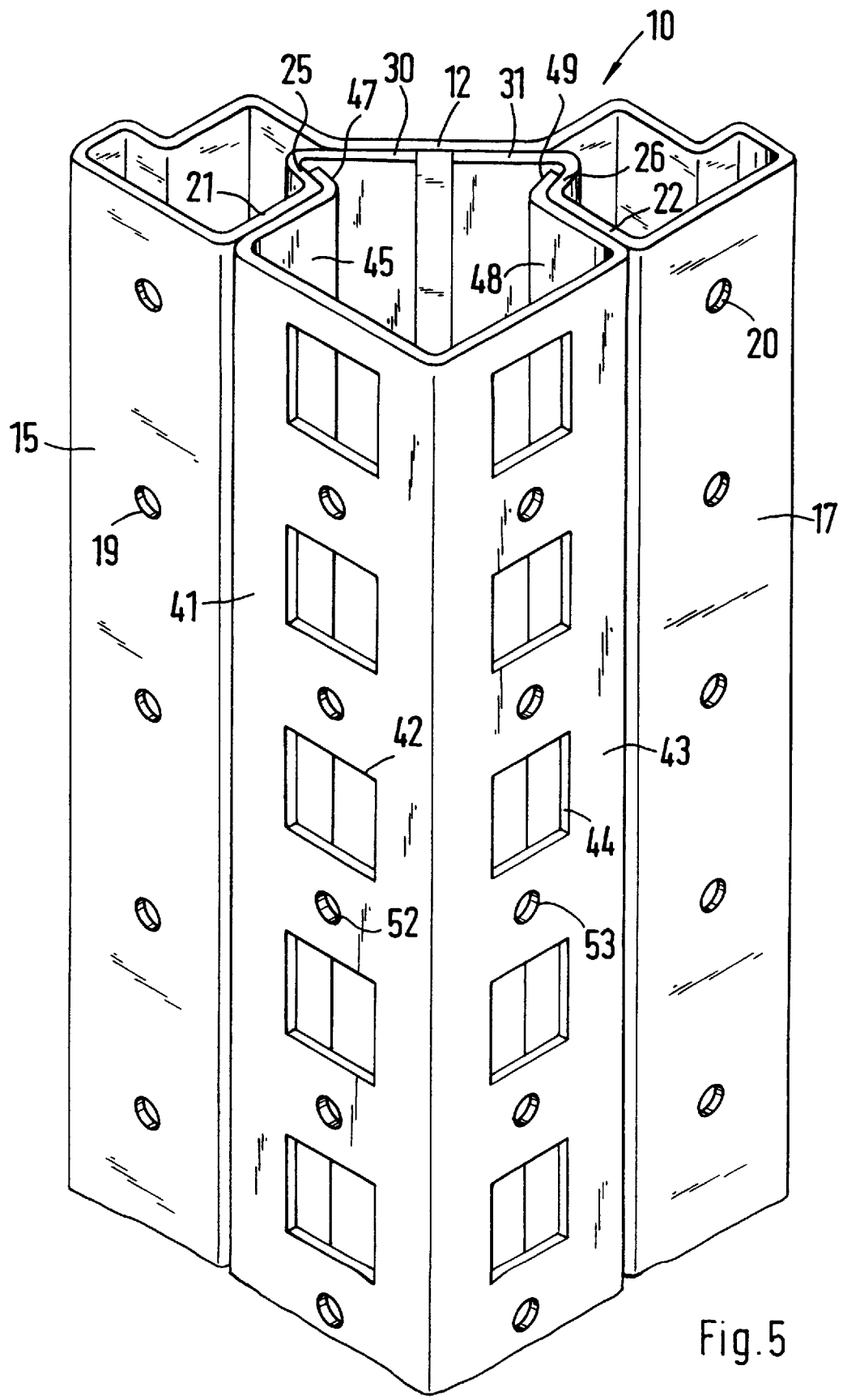
Figure 6:
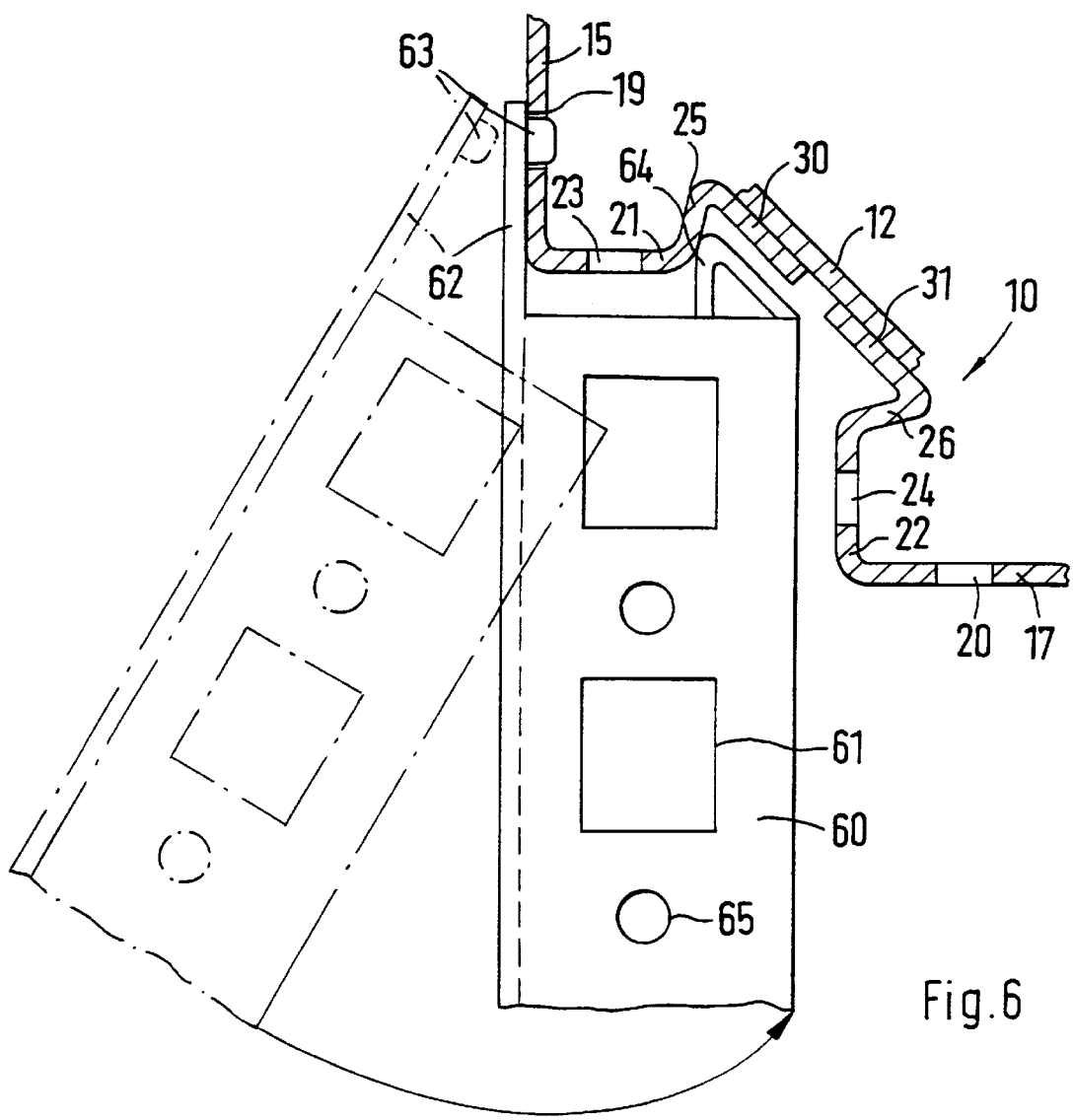

There is shown in:

FIG. 1 a frame limb in cross-section comprising two sealing webs and an open dovetail groove, FIG. 2 a frame limb in cross-section comprising two contact webs and a closed dovetail groove, FIG. 3 schematically the fitting to the frame limb of a mounting rail, essentially of square cross-section and designed as an open hollow profile section, FIG. 4 schematically the fitting to the frame limb of a mounting rail, which is essentially U-shaped, FIG. 5 a partial view of a frame limb with a fitted mounting rail according to FIG. 3 and FIG. 6 schematically the fitting of a mounting rail at right angles to the frame limb.

The frame limbs 10 are preferably designed in mirror-image like manner in relation to the cross-sectional diagonal 11 so as to be usable for each limb of the frame structure. The orientation of the frame structure is at all times so designed that it forms a rebate for the mounting rail towards the interior of the frame structure, which is preferably symmetrical in relation to the cross-sectional diagonal. In the embodiment according to FIG. 1, a connecting section 12 in relation to the outer edge forms a triangular rebate for the folded edges of the wall components and likewise for the hinge and closing components of the cabinet door. The connecting section 12, by way of sealing webs 13 and 16, merges into profile sides 15 and 17, provided with rows of fastening formations 19 and 20 and/or bores. The profile sides 15 and 17 are orientated at right angles to the exterior sides of the frame structure facing the former. The sealing webs 13 and 16 are designed in two layers by a web section 14 and 18 and part of the profile sides 15 and 17, the web sections 14 and 18 projecting at right angles to the exterior sides of the frame structure and projecting beyond the connecting section 12. The web sections 14 and 18 in rounded off manner, pass into the profile sides 15 and 17. If the wall components are provided with edges and sealing elements, these may be fitted tightly to the frame structure.

The edges of the profile sides 15 and 17, facing away from the sealing webs 13 and 16, merge into receiving formations 21 and 22, which may likewise be provided with fastening formations 23 and 24 and/or bores in the modular system. On the other hand only a few fastening formations 23 and 24 and/or bores may be provided in the receiving formations 21 and 22. The receiving formations 21 and 22 terminate in terminal sections 25 and 26, folded once only, at an obtuse angle to the receiving formations 21 and 22 and forming an open dovetail groove 27 following on to the rebate, defined by the receiving formations 21 and 22.

As shown in FIG. 2, instead of sealing webs 13 and 16, flush contact webs may be formed on the connecting section 12, the web sections 14 and 18 being connected to the profile sides 15 and 17 via contact sections 28 and 29. The contact sections 28 and 29 extend parallel to the outsides of the frame structure facing the former and thus likewise parallel to the wall elements fitted thereto.

The terminal sections of the receiving formations 21 and 22 are folded over twice, as indicated by the reference numerals 25 and 30 or 26 and 31. The twice folded terminal sections, following on to the rebate formed by the receiving formations 21 and 22, take the form of a closed dovetail groove 27'. The second partial sections denoted as 30 and 31 oppose one another and bear against the interior of the connecting section 12. In order to increase the stability, the partial sections denoted as 30 and 31 of the terminal sections bent over twice, are firmly bonded to the connecting section 12.

As can be seen from FIG. 3, a mounting rail 40, designed as an essentially square open hollow profile section, may be inserted into the rebate of the receiving formations 21 and 22 and be clipped into the dovetail groove 27'. For this purpose the fastening limbs 45 and 48 of the mounting rail 40 merge into engagement formations 47 and 49, which are likewise at an obtuse angle in relation to the fastening limbs 45 and 48 just like the first partial sections 25 and 26 of the terminal sections of the receiving formations 21 and 22. The limbs 41 and 43 positioned outside the rebate of the mounting rail 40 are flush with the profile sides 15 and 17 of the frame limb 10, as soon as the mounting rail 40 has latched onto the frame limb 10. The limbs 41 and 43 of the mounting rail 40 are provided with rows of fastening formations 42 and 44 and/or bores 52 and 53 matching the modular system and provide fastening facilities in two directions.

At one of the fastening limbs, for example 45, a retention pin 46 is formed on, which is inserted into a fastening formation 23 or 24 of the receiving formation 21 or 22. In this manner the mounting rail 30 is orientated and positioned on the frame limb 10.

As shown in FIG. 4, the cross-section of the mounting rail 40 may be different. The profile sides 41 and 43 are very narrow and are interconnected by a connecting section 50, extending preferably parallel to the connecting section 12 of the frame limb 10 and provide with a row of fastening formations 51 and/or bores in accordance with the modular system. This open mounting rail 40 as well has so much elasticity in relation to the fastening limbs 45 and 48 that the engagement formations 47 and 49 may be clipped into the closed dovetail groove 27'.

A portion of a frame limb 10 can be seen in FIG. 5, in which a mounting rail 40 according to FIG. 3 is clipped into the rebate and the dovetail groove. In this context, the fastening limbs 45 and 48 bear snugly against the receiving formations 21 and 22 of the frame limb 10. The engagement formations 47 and 49 latch in close contact behind the first partial sections 25 and 26 of the terminal sections, bent over twice, of the frame limb 10 and bring about an excellent support of the mounting rail 40 on the frame limb 10.

Finally, FIG. 6 shows how a mounting rail 60 may be fitted to a frame limb 10, projected therefrom at right angles. In the working example, the mounting rail 60 is U-shaped and in its limbs, in accordance with the modular system, bears rows of fastening formations 61 and/or bores 65. At the far ends of the mounting rail 60, fastening lugs 62 with a retention pin 63 are formed on. The retention pin 63 is inserted into a fastening formation 19 or bore in the profile side 15 of the frame limb 10 and by pivotal movement is clipped with an engagement formation 64 behind the first partial section 25 of the dovetail groove 27'. The engagement formation 64 is formed on at the far end of the mounting rail 60. The mounting rail 60, forming an extension of the profile side 15 on the frame limb 10 projects in the direction towards the interior of the cabinet and is parallel to the outside of the frame structure, facing the profile side 17.

In the same manner, the mounting rail 60 may likewise be fitted to the profile side 17, the engagement formation 64 latching behind the first partial section 26 of the twice bent over terminal section of the receiving formation 22. The retention pin 63 once again takes over the positioning of the mounting rail 60 so that its fastening formations 61 and/or bores 65 are orientated towards the fastening formations 19 and 20 of the profile sides 15 and 17 and the fastening formations 23 and 24 of the receiving formations 21 and 22 of the frame limbs 10.

We claim:

1. In a frame structure having frame limbs for a switch gear cabinet wherein the frame limbs are designed in a mirror-image manner in relation to cross-section diagonals of the frame limbs and in an interior region of the frame structure have two receiving formations with fastening rebates to fasten mounting rails, the receiving formations being orientated parallel to associated sides of the frame structure, the improvement comprising:

the receiving formations (21, 22) passing into a plurality of terminal sections (25, 26 or 25, 30; 26,31) each of the receiving formations (21, 22) having a retention rebate (23, 24) and forming a closed dovetail groove (27, 27') the mounting rails (40, 60) having a plurality of engagement formations (47, 49, 64) each having a retention pin (46) engageable with the retention rebate (23, 24) and forming an open dovetail engageable within the closed dovetail groove (27, 27').

2. In a frame structure according to claim 1, wherein the mounting rails (40) comprise a plurality of fastening limbs (45, 48) bearing against the receiving formations (21, 22) of the frame limbs (10), the fastening limbs (45, 48) merge into the engagement formations (47, 49) and the terminal sections form an obtuse angle defined by a first partial section (25, 26) with the receiving formations (21, 22) and the engagement formations (47, 49) on the fastening limbs (45, 48) of the mounting limbs (40).

3. In a frame structure according to claim 2, wherein
the mounting rails (40) are each formed as a hollow profile section of a generally square cross-section,
a first width of the fastening limbs (45, 48) correspond to a second width of the receiving formations (21, 22) of the frame limbs (10), and
a plurality of profile sides (41, 43) of the mounting rails (40) project from the fastening rebates defined by the receiving formations (21, 22) and have one of a plurality of rows of second retention rebates (42, 44) and a plurality of bores (52, 53).

4. In a frame structure according to claim 2, wherein
the mounting rails (40) are each formed as an open hollow profile section,
a first width of the fastening limbs (45, 48) correspond to a second width of the receiving formations (21, 22) of the frame limbs (10),
the fastening limbs (45, 48) outside of the fastening rebates defined by the receiving formations (21, 22) merge into a plurality of profile sides (41, 43) positioned at right angles to the fastening limbs (45, 48), and
the profile sides (41, 43) are interconnected by a connecting section (50) positioned at an obtuse angle with respect to the profile sides (41, 43), and the connecting section (50) has a row of a plurality of fastening formations (51).

5. In a frame structure according to claim 4, wherein
as part of the frame limbs (10), facing away from the terminal sections (25, 26; 25, 30; 26, 31) the profile sides (15, 17), at right angles to exterior sides of the frame structure and having the fastening rebates (19, 20), proceed to the receiving formations (21, 22).

6. In a frame structure according to claim 5, wherein
the mounting rail (60) has at least one of a U-shaped cross-section, a plurality of rows of a plurality of fixation rebates (61), and a plurality of bores (65),
a plurality of fixing lugs (62) with a retention pin (63) project from far ends of the mounting rails (60), the retention pin (63) is insertable into the fastening rebate (19), and
one of the far ends of the mounting rails (60) having a plurality of engagement formations (64) which clip into the closed dovetail groove (27, 27'), latching behind the terminal section (25) of the closed dovetail groove (27, 27').

7. In a frame structure according to claim 6, wherein
the profile sides (15, 17) of the frame limbs (10) are interconnected by a connecting section (12), and
a plurality of the second partial sections of the terminal sections (25, 30; 26, 31) of the receiving formations (21, 22) contact the connecting section (12) and are fixed to the connecting section (12).

8. In a frame structure according to claim 1, wherein the mounting rails (40) comprise a plurality of fastening limbs (45, 48) bearing against the receiving formations (21, 22) of the frame limbs (10),
the fastening limbs (45, 48) merge into the engagement formations (47, 49) and
the terminal sections form an obtuse angle defined by a first partial section (25, 26) with the receiving formations (21, 22) and the engagement formations (47, 49) on the fastening limbs (45, 48) of the mounting rails (40).

9. In a frame structure according to claim 1, wherein
the mounting rails (40) are each formed as a hollow profile section of a generally square cross-section,
a first width of a plurality of fastening limbs (45, 48) corresponds to a second width of the receiving formations (21, 22) of the frame limbs (10), and
a plurality of profile sides (41, 43) of the mounting rails (40) project from the of fastening rebates defined by the receiving formations (21, 22) and have one of a plurality of rows of second retention rebates (42, 44) and a plurality of bores (52, 53).

10. In a frame structure according to claim 1, wherein
the mounting rails (40) are each formed as an open hollow profile section,
a first width of a plurality of fastening limbs (45, 48) corresponds to a second width of the receiving formations (21, 22) of the frame limbs (10),
the fastening limbs (45, 48) outside of the fastening rebates defined by the receiving formations (21, 22) merge into a plurality of profile sides (41, 43) positioned at right angles to the fastening limbs (45, 48), and
the profile sides (41, 43) are interconnected by a connecting section (50) positioned at an obtuse angle with respect to the profile sides (41, 43), and the connecting section (50) has a row of a plurality of fastening formations (51).

11. In a frame structure according to claim 10, wherein
as part of the frame limbs (10), facing away from the terminal sections (25, 26; 25, 30; 26, 31) the profile sides (15, 17), at right angles to exterior sides of the frame structure and having the of fastening rebates (19, 20), proceed to the receiving formations (21, 22).

12. In a frame structure having frame limbs for a switch gear cabinet wherein the frame limbs are designed in a mirror-image manner in relation to cross-section diagonals of the frame limbs and in an interior region of the frame structure have two receiving formations with fastening rebates to fasten mounting rails, the receiving formations being orientated parallel to associated sides of the frame structure, the improvement comprising:
the receiving formations (21, 22) passing into a plurality of bent terminal sections (25, 26 or 25, 30; 26, 31) forming a dovetail groove (27, 27'), the mounting rails (40, 60) having a plurality of corresponding engagement formations (47, 49, 64), the mounting rail (60) having at least one of a U-shaped cross-section, a plurality of rows of a plurality of fixation rebates (61), and a plurality of bores (65),
a plurality of fixing lugs (62) with a retention pin (63) projecting from far ends of the mounting rails (60), the retention pin (63) insertable into the fastening rebate (19), and
one of the far ends of the mounting rails (60) having a plurality of engagement formations (64) which clip into the dovetail groove (27, 27'), latching behind the terminal section (25) of the dovetail groove (27, 27').

13. In a frame structure according to claim 12, wherein
a plurality of profile sides (15, 17) of the frame limbs (10) are interconnected by a connection section (12), and
a plurality of the second partial sections of the terminal sections (25, 30; 26, 31) of the receiving formations (21, 22) contact the connecting section (12) and are fixed to the connecting section (12).

* * * * *